United States Patent [19]
Satta

[11] 3,713,425
[45] Jan. 30, 1973

[54] FUEL SUPPLY DEVICE FOR A ROTARY (WANKEL) INTERNAL COMBUSTION-ENGINE

[75] Inventor: Orazio Satta, Milan, Italy
[73] Assignee: Alfa Romeo S.p.A., Milan, Italy
[22] Filed: Feb. 8, 1971
[21] Appl. No.: 113,248

[30] Foreign Application Priority Data
Feb. 12, 1970 Italy..........................20527 A/70

[52] U.S. Cl.................................................123/8.13
[51] Int. Cl................................................F02b 53/04
[58] Field of Search..........................123/8.11, 8.13

[56] References Cited
UNITED STATES PATENTS 3,168,077  2/1965  Froede..............................123/8.13
3,265,046  8/1966  Paschke............................123/8.13
3,587,534  6/1971  Weichelt...........................123/8.13

FOREIGN PATENTS OR APPLICATIONS 1,182,472  11/1964  Germany...........................123/8.13

Primary Examiner—Allan D. Herrmann
Attorney—Holman & Stern

[57] ABSTRACT

A rotary internal combustion engine, of the so-called Wankel type in which, in addition to the principal intake port, a secondary intake port is provided in order remedy to the inconveniences which are experienced when such an engine idles. Rate of flow adjustment means for the air and the fuel are also provided.

7 Claims, 4 Drawing Figures

FUEL SUPPLY DEVICE FOR A ROTARY (WANKEL) INTERNAL COMBUSTION-ENGINE

BACKGROUND OF THE INVENTION

This invention relates to a fuel supply device for a rotary internal combustion engine, and more particularly of a rotary engine the NSU-Wankel type.

A rotary engine of the NSU Wankel type has reference to an engine including an outer body having a cavity therein and an inner body relatively rotatable within the cavity about an axis laterally spaced from but parallel to the axis of the cavity, the outer body having axially spaced end walls and a peripheral wall interconnecting the end walls to define the cavity, the inner surface of the peripheral wall being provided with a multi-lobe profile which is preferably an epitrochoid, the inner body having end faces adjacent the end walls of the outer body for sealing cooperation therewith and a peripheral surface with a plurality of circumferentially spaced apex portions, the number of apex portions usually exceeding the number of lobes of the epitrochoid by one and each apex portion carrying a seal element for sealing engagement with the inner surface of the peripheral wall to provide a plurality of working chambers which vary in volume upon relative rotation of the two bodies.

There is also provided a carburetor which feeds a fuel-air mixture into the cavity within the engine housing through a suitable channel terminating in an intake port in the housing wall. In a given inner body cycle, the inner body will cover an uncover the intake port and also a corresponding exhaust port to admit a fresh charge and exhaust combusted gases at the proper time in the cycle. The intake port may be provided with a relatively large cross-section resulting in a very good rate of fuel flow and corresponding high performance.

In the known engines of this type, the combustion chambers are defined by a rotor constituting the inner body, their location in the cavity in which the rotor is rotatable being changed, as well as their volume. More particularly, in the cavity both the opening of the intake port in correspondence with the position taken by each chamber as it is being expanded during progress of the induction stroke, and the opening of an outlet port in correspondence with the position taken by each chamber on completion of the expansion subsequent to the ignition of the combustible mixture, are provided.

However, with a view to obtaining a satisfactory engine efficiency at the highest RPMs, the inlet port is arranged to be in communication with each chamber slightly in advance of the beginning of the induction, whereas the outlet port is arranged to still be in communication with the chamber slightly after the exhaust stage. In actual practice, things are such that the chamber is, at least during a certain angle of rotation of the engine, simultaneously in communication both with the inlet and the exhaust ports. At the highest engine RPMs, this involves considerable advantages as regards the volumetric efficiency of the engine. In addition, and still at the highest RPMs, the inertia of the combustible mixture stream and that of the exhaust gases as well, facilitates the discharge and encourages somewhat a scavenging of the chamber between the exhaust and the induction.

Serious drawbacks are experienced with this arrangement whenever the engine rotates at the lower RPMs, such as during idling. The phase angle during which both the inlet port and the exhaust port are in communication with the chamber, is too wide in time and exhaust gas reflows can be experienced in the inlet port, with the latter port now being under a negative pressure. This fact causes an irregular supply so that it becomes necessary, for example, for the RPM rate for idling be kept relatively high.

This invention has as its object to overcome the above enumerated drawbacks and permit a regular engine run also at low RPMs.

SUMMARY OF THE INVENTION

According to the present invention, a rotary internal combustion engine, more particularly a rotary engine of the NSU-Wankel type, comprises a hollow body in which a rotor is rotatable, the rotor defining with the body at least one chamber whose volume and position within the hollow body are varied in cyclical sequence, and in which the induction, compression, explosion and exhaust stages take place, with the chamber being positioned, substantially at the beginning of the induction stage, firstly in registry with a main inlet port and subsequently in registry with a secondary inlet port, the secondary inlet port being controlled to feed the fuel to the chamber substantially when the rotor is rotating at its lowest rate, and the main inlet port being controlled to feed the fuel to the chamber when the rotor is rotating at a rate higher then the idling rate.

The foregoing and other features and advantages of the engine according to the present invention will become clearer from the ensuing description of exemplary embodiments thereof as shown in the accompanying drawings, wherein:

BRIEF DESCRIPTION OF THE DRAWINGS

As illustrated in FIG. 1, the rotary engine includes a housing or stator 10 constituted by a peripheral wall 10a having an inner surface 11 of a multi-lobe profile, preferably of epitrochoidal profile and a pair of end walls. The peripheral wall and end walls constitute a cavity in which a rotor 12 is rotatable and the rotor's peripheral surface is provided with a plurality of circumferentially spaced apex portions 13, 14 and 15 and there is one more apex portion than the number of lobes on the inner surface 11. The apex portions carry sealing members 13a, 14a, and 15a which coact with the surface 11 to provide chambers 16, 17 and 18.

Figure 3:
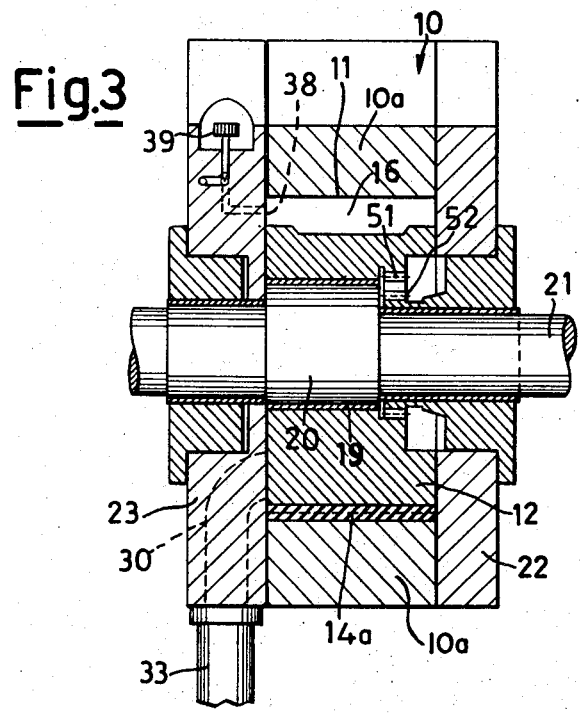
FIG. 3 is a view taken along the line III—III of FIG. 2 the view looking in the direction of the arrows.

It is known how rotation is imparted to the rotor 12 in such a type of engine. The rotor is mounted on an eccentric 20 integral with a motor shaft 21 and as shown in FIG. 3 has an internally toothed ring 51 which is in epicycloidal mesh with an internal pinion 52 integral with an end wall 22 of the stator and in conjunction with end wall 23 laterally closes the stator 10 and supports the shaft 21.

The known constructional features of the engine are not described herein, for the sake of brevity, the engine being disclosed in more detail, for example, in the U.S. Pat. No. 3,007,460 to Max Bentele et al., entitled "Cooling arrangement for rotary mechanisms."

Figure 1:
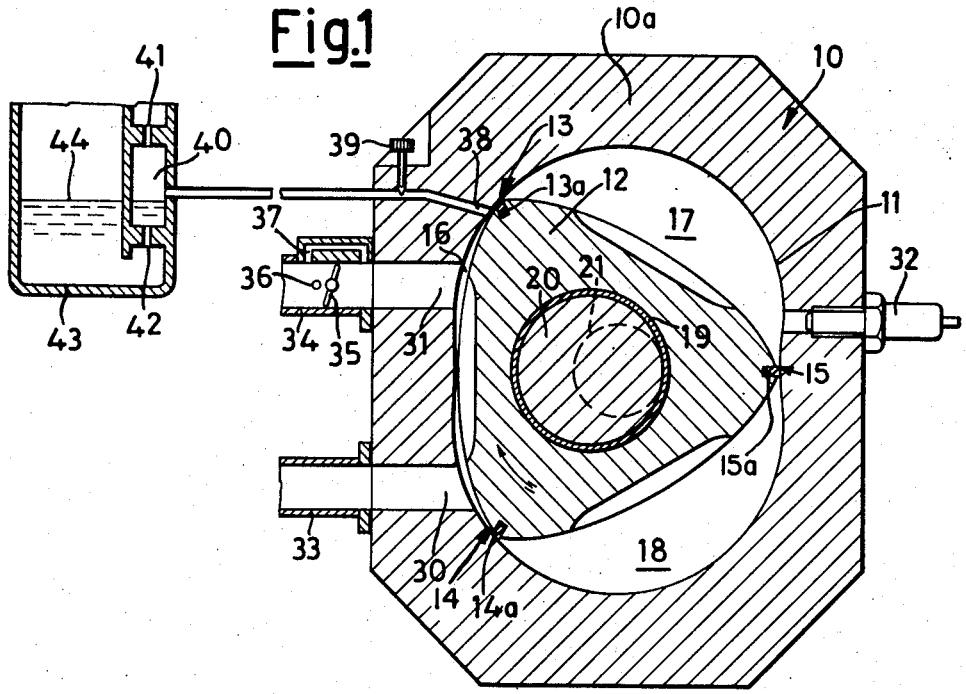
FIG. 1 is a diagrammatical cross-sectional view of a rotary engine according to this invention.

As is shown in FIG. 1, there are formed, in the stator 10, an exhaust duct 30 and an intake duct 31, the ports of which communicate with the cavity, a spark plug 32 is located in an appropriate position, and is fed by conventional electric appliances (not shown). The duct 30 communicates with a line in piping 33 which conveys the exhaust gases and can have conventional purifying and sound-dampening devices, (not shown). The duct 31 is fed with a combustion-supporting fluid, such as air, by a line or piping 34, and the line 34 is provided with a throttle valve 35.

In the immediate neighborhood of the throttle valve 35 are mounted means diagrammatically shown at 36 through which an atomized fuel is introduced into the airstream which flows through the piping 34, according to an arrangement which is conventional for Otto-cycle engines, namely, a passageway 37 which bypasses the throttle valve 35 and the means 36.

A secondary intake duct 38 passes through the stator 10, and the duct 38 is throttled by an adjustment screw 39 and fed by a chamber 40 which is in communication with the atmosphere through a calibrated passageway 41 and with a liquid fuel, contained in a float chamber 43 kept at a constant level 44 through a calibrated passageway 42. The float chamber can be the chamber of the main carburetor which feeds the means 36. If so, the duct 38 is fed as a conventional idler nozzle of a usual carburetor. It is obvious that, to the end of the operation of the engine, the rotor is rotated clockwise as viewed in FIG. 1, and the port where the duct 38 opens is overridden by the seal 13 and thus placed in communication with the chamber 16 which initiates the induction, with a certain delay relative to the opening of the port of the main duct 31.

During idling of the engine as shown, the throttle valve 35 is completely closed. The chamber 16 shown in the drawing in its minimum volume configuration, is expanded by virtue of the rotation of the rotor and carries out the induction stage. During this stage, the fuel is drawn by the duct 38 in a finely atomized condition and additional air is drawn by the intake duct 31, to which it arrives from the passageway 37.

It is obvious that, with such an arrangement, the fuel duct, which, during idling, is the duct 38 is connected to the chamber 16 as the chamber 16 has completed the exhaust stage. By so doing, any reflow of exhaust gases into the intake duct is prevented, as are the attendant disadvantages above outlined which have a bearing on the regular run of the engine. The idling is defined by the rate of flow of duct 38, as adjusted by the screw 39, and by the rate of flow of the passageway 37, which can also be equipped with a rate of flow adjusting means, (not shown).

As the throttle valve 35 is opened, the rotor 10 rotates at a high rate and is normally fed through the duct intake 31, which is placed in communication with the chamber 16 with a certain advance with respect to the position at which induction is started. At high rates of revolution, the fuel contribution through the secondary duct 38 is negligible.

Figure 2:
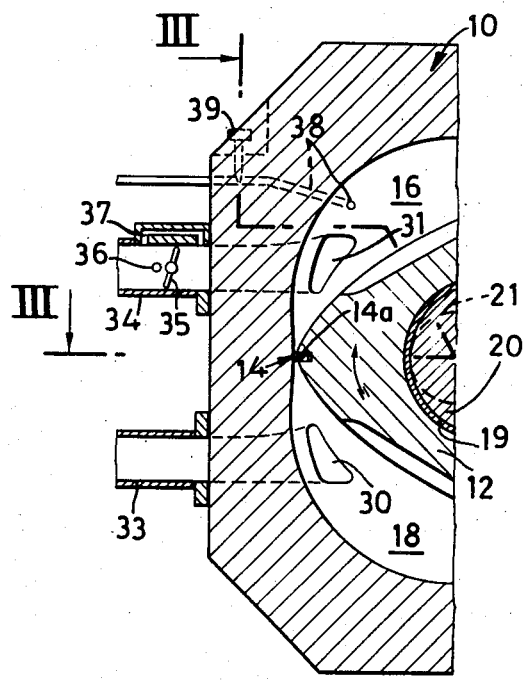
FIG. 2 is a diagrammatical fragmentary cross-sectional view, of another rotary engine according to the invention.

FIGS. 2 and 3 show an embodiment which is similar to the foregoing, of an engine according to the invention, and similar reference numerals denote corresponding elements. The ducts 30, 31 and 38, in this case, are formed through the sidewall 23 and the relevant ports are either closed or opened as the corners of the rotor, as formed by the intersections of the faces with the lateral surfaces intercept the ducts. The rotor 12 is shown in a position in which the chamber 16 is in the induction stage. The operation of this engine is wholly similar to that of the engine of FIG. 1.

Figure 4:
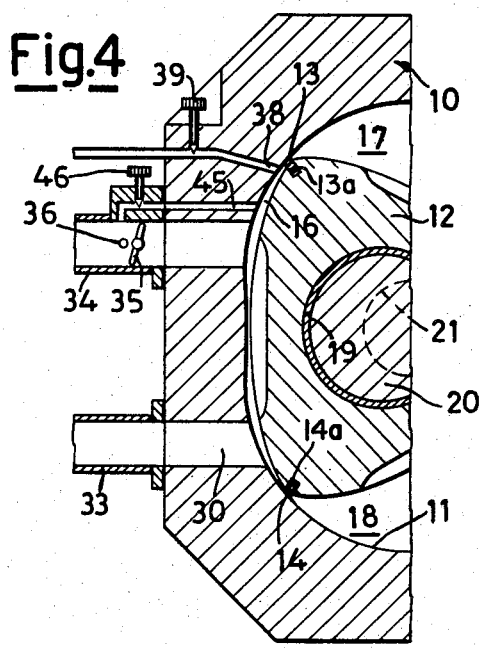
FIG. 4 is a diagrammatical fragmentary cross-sectional view of another embodiment of an engine according to the invention.

Lastly, FIG. 4 shows another embodiment of the present engine in which the air required for combustion during idling is brought to the chamber through a duct 45 having a variable rate of flow due to a screw 46. The duct 45 draws air from the piping 34 upstream of the throttle valve 35 and of the fuel feeding means, as diagrammatically shown at 36. By so doing, the air intake is also delayed and the time during which both the induction and exhaust ports are in communication with a chamber is restricted.

It is obvious, at this stage, that the opening inside the stator of the duct 38 for feeding the fuel can be placed at an appropriate distance apart from the main intake duct 31 in the direction of advance of the rotor, so that the time during which communication is established with the induction chamber when the latter still communicates with the exhaust duct 30, is reduced to any desired extent or even annulled.

Of course, the duct 38 can have the most appropriate route consistent with the configuration of the engine in which it is incorporated, since only its position relative to the exhaust duct is critical, as outlined above.

It is important to notice, also, that the presence of distinct duct for idling renders particularly convenient the application to the engine of such devices as to annul the rate of flow of the fuel fed to the engine when a braking action is required, that is, when the engine is driven to rotation spontaneously and the throttle valve 35 is closed. To annul the rate of flow of the fuel under such conditions is of paramount importance to the end of reducing the emission of unburned exhaust gases susceptible of polluting the atmosphere. It is apparent that, to obtain such an effect in the engine according to the invention, it suffices to place cutoff means, whose description is not a part of the present invention, in the duct 38, so that they do not disturb in any way the supply through the duct 31 at a faster RPM of the engine.

What is claimed is:

1. A rotary internal combustion engine of the type including an outer body having a cavity therein and an inner body relatively rotatable within the cavity about an axis laterally spaced from but parallel to the axis of the cavity, said outer body having axially spaced end walls and a peripheral wall interconnecting the end walls to define the cavity, the inner surface of the peripheral wall having a multi-lobe profile which is basically an epitrochoid, the inner body having end faces disposed adjacent the end walls for sealing cooperation therewith and a peripheral surface with a plurality of circumferentially spaced apex portions, a seal member carried by each apex portion and engaging the multi-lobe inner surface of the outer body peripheral wall and the end walls in sealing relations to provide a plurality of working chambers between the two bodies which may vary in volume on relative rotation of the two bodies, the induction, compression and ignition, power and exhaust stages of the engine taking place sequentially, a main intake duct communicating with the cavity and into which duct fuel and air is admitted, a throttle valve operably related to the main intake duct, a secondary intake duct of substantially less cross-sectional area than the cross-sectional area of the main intake duct communicating with the cavity downstream of the main intake duct, and an exhaust duct communicating with the cavity upstream of the main intake duct, said secondary intake duct supplying a separate idling combustible mixture into the cavity, means for supplying fuel to the secondary intake duct, and a second duct through which air is fed into the cavity for mixture with the fuel supplied to the secondary intake duct, said second duct receiving air from the air supply to the main intake duct, the arrangement being such that at the start of the induction stage, the chamber is positioned in registry with the main intake duct and then sequentially in registry with the secondary intake duct, with the secondary intake duct being controlled to feed fuel to the chamber during idling of the engine and the main intake duct being controlled to feed fuel to the chamber when the engine is operating at a rate higher than idling and the secondary intake duct only being placed in communication with the exhaust duct upon termination of the exhaust stage.

2. The rotary internal combustion engine as claimed in claim 1 in which said second duct communicates with the main intake duct downstream of the throttle valve.

3. The rotary internal combustion engine as claimed in claim 1 in which said second duct communicates with the cavity intermediate the main intake duct and the secondary intake duct.

4. The rotary internal combustion engine as claimed in claim 1 including means operably related to said secondary intake duct to adjust the rate of flow of the fuel supplied therethrough.

5. The rotary internal combustion engine as claimed in claim 3 including means operably related to said second duct to adjust the rate of flow of air supplied through said second duct.

6. The rotary internal combustion engine as claimed in claim 1 in which said secondary intake duct extends through the peripheral wall portion of the outer body.

7. The rotary internal combustion engine as claimed in claim 1 in which said secondary intake duct extends through one of the end walls of said outer body.

* * * * *